United States Patent
Veeraraghavan et al.

(10) Patent No.: US 9,444,366 B2
(45) Date of Patent: Sep. 13, 2016

(54) DUAL MODE MICRO-INVERTER SYSTEM AND OPERATION

(71) Applicant: Kripya LLC, Sammamish, WA (US)

(72) Inventors: Vilakkudi G. Veeraraghavan, Sammamish, WA (US); Ramarao Ananathakrishnan, Coimbatore (IN); Muthiam S Balavenkataraman, Coimbatore (IN)

(73) Assignee: Kripya LLC, Sammamish, WA (US)

( * ) Notice: Subject to any disclaimer, the term of this patent is extended or adjusted under 35 U.S.C. 154(b) by 107 days.

(21) Appl. No.: 14/616,608

(22) Filed: Feb. 6, 2015

(65) Prior Publication Data

US 2015/0295511 A1   Oct. 15, 2015

Related U.S. Application Data

(60) Provisional application No. 61/978,594, filed on Apr. 11, 2014.

(51) Int. Cl.
*H02M 1/08* (2006.01)
*H02M 7/44* (2006.01)
*H02J 3/38* (2006.01)

(52) U.S. Cl.
CPC .............. *H02M 7/44* (2013.01); *H02J 3/383* (2013.01)

(58) Field of Classification Search
CPC ............................. H02M 1/08; H02M 7/537
USPC ........................................ 363/72, 95, 97, 98
See application file for complete search history.

(56) References Cited

U.S. PATENT DOCUMENTS

| | | | | |
|---|---|---|---|---|
| 5,991,181 A * | 11/1999 | Fujii | ..................... | H02J 3/46 363/95 |
| 7,855,906 B2 * | 12/2010 | Klodowski | ............. | H02M 7/48 363/97 |
| 8,310,214 B2 | 11/2012 | Garces Rivera et al. | | |
| 8,861,230 B2 * | 10/2014 | Sigamani | ............ | H02M 1/4225 363/34 |
| 9,042,134 B2 * | 5/2015 | Liu | ..................... | H02M 1/12 363/40 |
| 2002/0036911 A1 * | 3/2002 | Okui | ..................... | H02J 9/062 363/95 |

(Continued)

OTHER PUBLICATIONS

PCT Search Report and Written Opinion for PCT Application No. PCT/US15/14923, mailed May 15, 2015, 9 pages.

*Primary Examiner* — Jeffrey Sterrett
(74) *Attorney, Agent, or Firm* — Lee & Hayes, PLLC (57) ABSTRACT

A dual mode direct current-to-alternating current (DC-AC) micro-inverter is capable of operating either with or without connection to an active external AC power source. The dual mode DC-AC micro-inverter may operate in "current control mode" when connection to the active AC power source is present and may operate in "voltage control mode" when connection to the active external AC source is absent. Processes for operating an array of these micro-inverters are disclosed. The dual mode operation capability enables the micro-inverter(s) to function both in the grid connected mode (i.e., current control mode) as well as off-grid mode (i.e., voltage control mode). The system is configured to sense the presence or absence of grid power and automatically select the appropriate mode of operation. For the voltage control mode of operation, a process may include designating a master from the array of micro-inverters in order to establish the voltage and frequency references.

20 Claims, 8 Drawing Sheets

(56) References Cited

U.S. PATENT DOCUMENTS

| | | | |
|---|---|---|---|
| 2004/0170038 A1* | 9/2004 | Ichinose | H01M 8/04559 363/95 |
| 2004/0207366 A1 | 10/2004 | Sung | |
| 2007/0159866 A1* | 7/2007 | Siri | H02M 3/33592 363/95 |
| 2008/0278983 A1* | 11/2008 | Park | H02J 7/35 363/95 |
| 2010/0253151 A1 | 10/2010 | Gerhardinger et al. | |
| 2013/0155735 A1 | 6/2013 | Ilic et al. | |
| 2013/0336025 A1* | 12/2013 | Figueroa | H02J 3/386 363/37 |
| 2015/0092462 A1* | 4/2015 | Ohori | H02M 7/44 363/71 |
| 2015/0200607 A1* | 7/2015 | Fujii | H02M 7/53871 363/97 |
| 2015/0270788 A1* | 9/2015 | Sawano | H02M 7/53871 363/98 |
| 2015/0288295 A1* | 10/2015 | Yu | H02M 7/219 363/97 |
| 2015/0295511 A1* | 10/2015 | Veeraraghavan | H02J 3/383 363/95 |
| 2016/0141978 A1* | 5/2016 | Matsuoka | H02M 7/537 363/97 |
| 2016/0164431 A1* | 6/2016 | Veeraraghavan | H02J 3/383 363/95 |

* cited by examiner

DUAL MODE MICRO-INVERTER SYSTEM AND OPERATION

CROSS REFERENCE TO RELATED APPLICATIONS

This application is based on and claims priority to U.S. Provisional Application No. 61/978,594, filed on Apr. 11, 2014, entitled, "DUAL MODE MICRO-INVERTER SYSTEM AND OPERATION," the contents of which are herein incorporated by reference.

BACKGROUND

Micro-inverters offer a means for providing ready-to-use alternating current (AC) at the point of an energy source, which makes them attractive for distributed energy generation systems of varying capacities such as solar energy systems. Micro-inverters offer the added advantages of modularity, maximum power efficiency, real time optimization, and superior means for monitoring and control of the overall system. Micro-inverters offer these benefits with minimal changes to the existing wiring in a building. Because of these benefits the use of micro-inverters are on the rise year to year.

Micro-inverters that are in the market today operate in the "grid-tie mode." This means that, in order for the micro-inverter to be functional, grid power has to be present. However, when grid power is absent in the "grid-tie mode," no harvesting of solar energy is possible. This is a serious limitation in regions across the globe where the access to and reliability of grid power is limited.

SUMMARY

Disclosed herein is a dual mode direct current-to-alternating current (DC-AC) micro-inverter that is configured with dual closed-loop control options. A first closed-loop control option may comprise a closed-loop current control algorithm and associated control algorithm for operation of the dual mode DC-AC micro-inverter during conditions where an active external power source provides a reference voltage and frequency. A second closed-loop control option may comprise a closed-loop voltage control algorithm and associated algorithm for operation of the dual mode DC-AC micro-inverter during conditions where the external power source is absent or otherwise inactive (i.e., the external power source does not provide a reference voltage and frequency). In the second closed-loop control option (i.e., voltage control mode), the voltage and frequency references can be synthesized internally by a built-in algorithm in the micro-inverter and the closed loop voltage control maintains the quality of the power output.

The dual mode DC-AC micro-inverter may be configured to sense the presence or absence of an external AC power source and, in response, select the appropriate closed-loop control scheme and associated algorithm for control purposes.

In some embodiments, an array of micro-inverters may be interconnected. When grid power from the external AC power source is absent for the array of micro-inverters, a software algorithm may enable dynamic polling of the status of individual ones of the micro-inverters in the array, identifying one of the micro-inverters that returns an acknowledgement, and selecting the identified micro-inverter as the master for providing the voltage and frequency references for remaining ones of the micro-inverters in the array to follow.

Also disclosed is a process for dynamically monitoring the performance of each of the dual mode DC-AC micro-inverters in an array, and turning off the ones that are not meeting the performance specifications.

Also disclosed is a dual mode micro-inverter array working in conjunction with an active load manger to control the total load connected to the array of DC-AC micro-inverters such that cumulative power drawn by the total load is less than the total output power generated by the array when the external AC power source is absent or not active.

The dual-mode DC-AC micro-inverter disclosed herein enables harvesting of solar power whenever solar radiation is present, and is not dependent on the presence of an active external AC power source for harvesting such energy.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

In the following detailed description of the embodiments, specific detailed examples are given in order to provide an understanding of the embodiments. However, it is to be appreciated that the embodiments may be practiced without these specific details. Furthermore, the techniques and systems disclosed herein are not limited to the described embodiments. Numerous modifications, changes, variation, substitutions and equivalents will be apparent to those skilled in the art.

Figure 1:
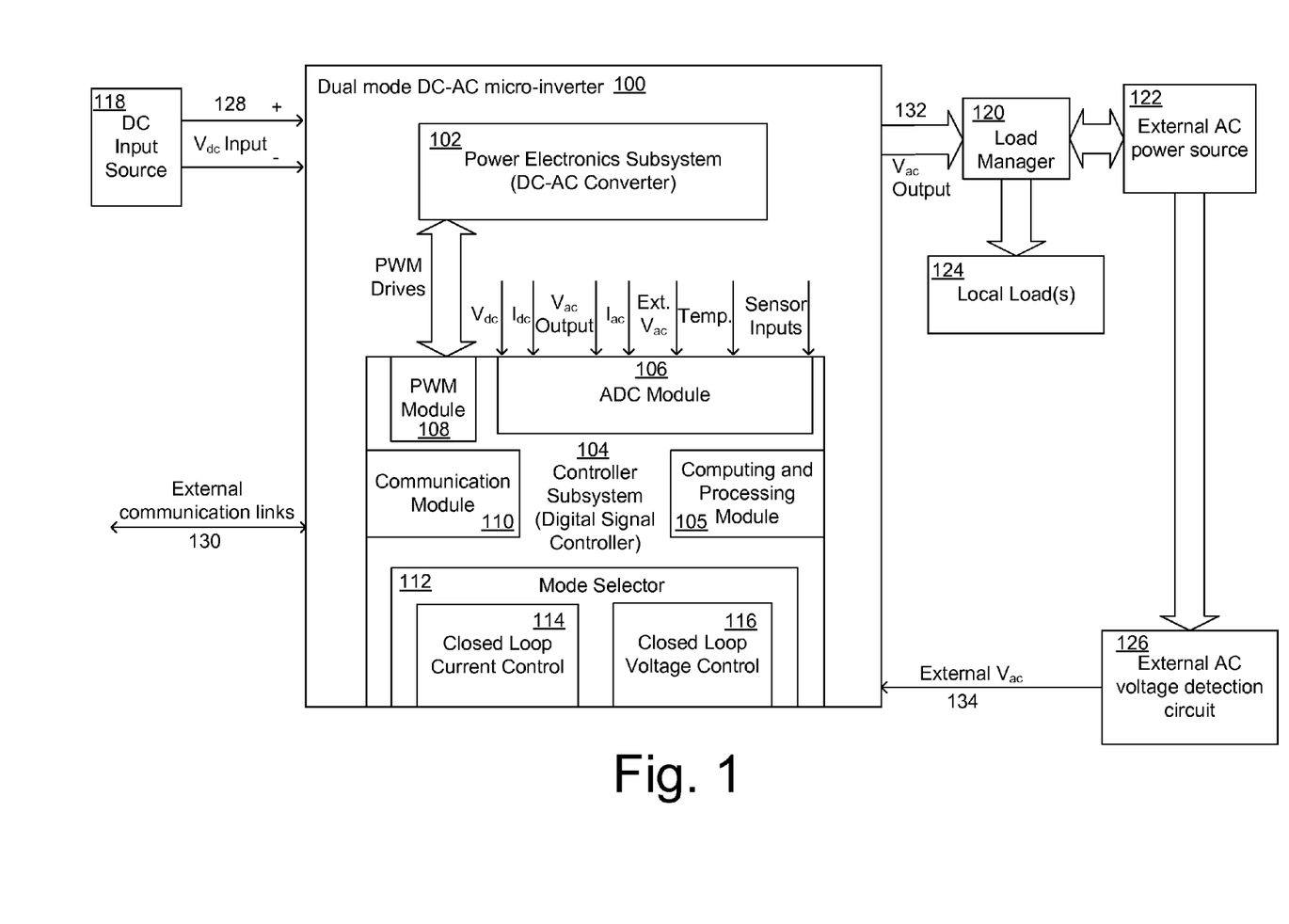
FIG. 1 is a schematic block diagram of an example dual mode DC-AC micro-inverter illustrating example sub-systems of the micro-inverter along with input, output, and communication interfaces.

FIG. 1 is a schematic block diagram of an example dual mode DC-AC micro-inverter 100 illustrating example subsystems along with input, output, and communication interfaces.

The dual mode DC-AC micro-inverter 100 (sometimes referred to herein as the "inverter 100", "micro-inverter 100", "dual mode inverter 100", or "dual mode micro-inverter 100") may include various subsystems. For example, the inverter 100 may include a power electronics subsystem 102 (or "DC-AC converter 102") for the conversion of DC to AC, and a controller subsystem 104 (which may be a Digital Signal Controller, programmable microcontroller, System on Chip or Field Programmable Gate Array) that may include a computing and processing module (105), an analog-to-digital converter (ADC) module 106, a pulse width modulation (PWM) module 108, a communication module 110, and a mode selector module 112. The mode selector module 112 may include a closed-loop current control algorithm 114 and closed-loop voltage control algorithm 116.

The dual mode DC-AC micro-inverter 100 may be interfaced with a direct current (DC) input source 118 on the input side, and to a load manager 120 on the output side, which is, in turn, coupled to an external AC power source 122 and one or more local loads 124.

A control circuit 126 may be configured to detect the presence or absence of active external AC voltage in the external AC power source 122 and communicate the status to the dual mode DC-AC micro-inverter 100 for mode selection.

$V_{dc}$ input 128 represents the analog signal input from the direct current (DC) input source 118 to the dual mode DC-AC micro-inverter 100.

External bidirectional communication link 130 represents the signals flow between the communication module 110 and one or more external/remote monitoring devices for monitoring and controlling the performance of micro inverter 100.

$V_{ac}$ Output 132 represents the analog signal output from the dual mode DC-AC micro-inverter 100 which may be connected to the load manager 120.

Based at least in part on an External AC voltage ($V_{ac}$) signal input value 134 provided by the control circuit 126, the mode selector module 112 may select a closed-loop current control mode (where External $V_{ac}$ is present) or a closed-loop voltage control mode (where External $V_{ac}$ is absent) of operation for the dual mode micro-inverter 100. In some embodiments, the External $V_{ac}$ signal input value 134 is binary with a value of "1" when the external AC power source 122 is present and active, and a value of "0" when the external AC power source 122 is absent or inactive.

The ADC module 106 may receive analog input values for the DC voltage ($V_{dc}$), DC current ($I_{dc}$), $V_{ac}$ Output, and AC current ($I_{ac}$), External $V_{ac}$ as well as temperature of one or more components from respective sensor circuits, and may convert the analog input values into digital values. The Computing and Processing Module 105 may compute parameters for the operation of the closed-loop current control algorithm 114 or the closed-loop voltage control algorithm 116, depending on the selected mode of operation. In some embodiments, the computing and processing module 105 incorporates fault protection features when the digitized values are outside of an allowable range for individual ones of the parameters by tripping the dual mode DC-AC micro-inverter 100 to the off state. For example, if the controller subsystem 104 has been programmed to accept input DC voltage $V_{dc}$ 128 in the range 22-26 volts, but the actual input DC voltage signal $V_{dc}$ 128 received is 20 volts, the micro-inverter 100 can be tripped to the off state and the corresponding error code can be communicated to the external/remote monitors via the communication module 110. In addition, the Controller subsystem 104 may also incorporate a software algorithm to enable Maximum Power Point Tracking (MPPT) from the DC input source 118 such that the maximum possible energy is harvested from the DC input source 118. The MPPT algorithm enables the DC input source 118 such as a solar panel to operate within a specific range of voltage corresponding to the peak of the power-voltage (P-V) curve for the panel, for a given set of environmental conditions such as available solar radiation and temperature and load conditions. As the environmental and load conditions change, the MPPT algorithm provides the means for dynamically adjusting the operating point to derive maximum power possible.

Based at least in part on the output of the closed-loop current control algorithm 114 or the closed-loop voltage control algorithm 116 (whichever mode is selected), the PWM module 108 may generate the PWM drive signals for the power electronics subsystem 102.

The power electronics subsystem 102 may include electronics (e.g., high frequency transformers, filter and regulation circuits, etc.) for the conversion of DC to AC. The AC output 132 from the power electronics subsystem 102 may be fed into the load manager 120, which in turn may be coupled to the external AC power source 122 and the local load(s) 124.

In the case when the external AC power source 122 is present and active, the AC output 132 from the dual mode micro-inverter 100 may be fed into the load manager 120 which serves as a pass through to the AC Power source 122. In the case when the external AC power source 122 is absent and/or inactive, the AC output 132 from the dual mode micro-inverter 100 may be directed to the local load(s) 124 via the load manager control circuit 120.

The DC input source 118 can be of any kind as long as the voltage and power specifications are consistent with the input specifications for the dual mode DC-AC micro-inverter 100. Some suitable examples of the DC input source 118 include, but are not limited to: (a) one or more photo voltaic solar panels, (b) one or more fuel cells, (c) one or more batteries, (d) one or more wind energy generators, or (e) one or more ultra capacitors.

The dual mode DC-AC micro-inverter 100 specifications may accept a variety of input sources as well as provide output AC voltage 132 that is readily usable in the environment it is employed. Suitable specifications and ranges for various parameters for the inverter 100 include, but are not limited to: (a) output power no greater than about 1000 watts (in one example, no greater than about 250 watts), (b) output voltage included in the range of about 90 to about 250 volts (in some examples, about 110 or about 220 volts), (c) output frequency included in the range of about 45 to about 65 hertz (Hz) (in some examples, about 50 or about 60 Hz.), (d) input DC voltage included in the range of about 10 to about 100 volts (in some examples, about 12, about 24, or about 36 volts).

The power electronics subsystem 102 (or DC-AC conversion subsystem) for the dual mode DC-AC micro-inverter 100 can be of different types as long as power conversion and regulation can be controlled via a PWM drive signal from the PWM module 108. For example, the conversion electronics in the power electronics subsystem 102 may include, without limitation: (a) a single stage DC-AC conversion system, (b) two stage DC-DC-AC conversion system, accomplished by using one or more high frequency transformers.

The dual mode DC-AC micro-inverter 100 can be applied in environments where the external AC power source 122 can either be a GRID power or a local AC generator such as a diesel generator.

The external voltage detection circuit 126 consists of an attenuation circuit, an isolation circuit, an analog amplifier, and analog comparator section. The external AC voltage is attenuated and isolated. The isolated external AC signal is applied to the analog amplifier to generate analog output. The analog amplifier output is compared by an analog comparator with a predefined reference voltage to generate the digital signal for External $V_{ac}$ 134 according to the presence or absence of an active external power source.

The load manager 120 control circuitry may partition the local loads 124 connected to it into units, each with a defined max power demand. Each of the partitioned units may be turned on or off via a relay circuit by wired or wireless means. The control circuitry may compute the total generated power by querying the controller subsystem 104 via the communication link 130. Based on the computed total generated power the load manager 120 control circuit may limit the number of units to be turned on such that the total power drawn by the units that are on is less than the total power generated.

FIGS. 2-4 and 6-8 illustrate example processes that may be carried out to perform the techniques described herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

Figure 2:
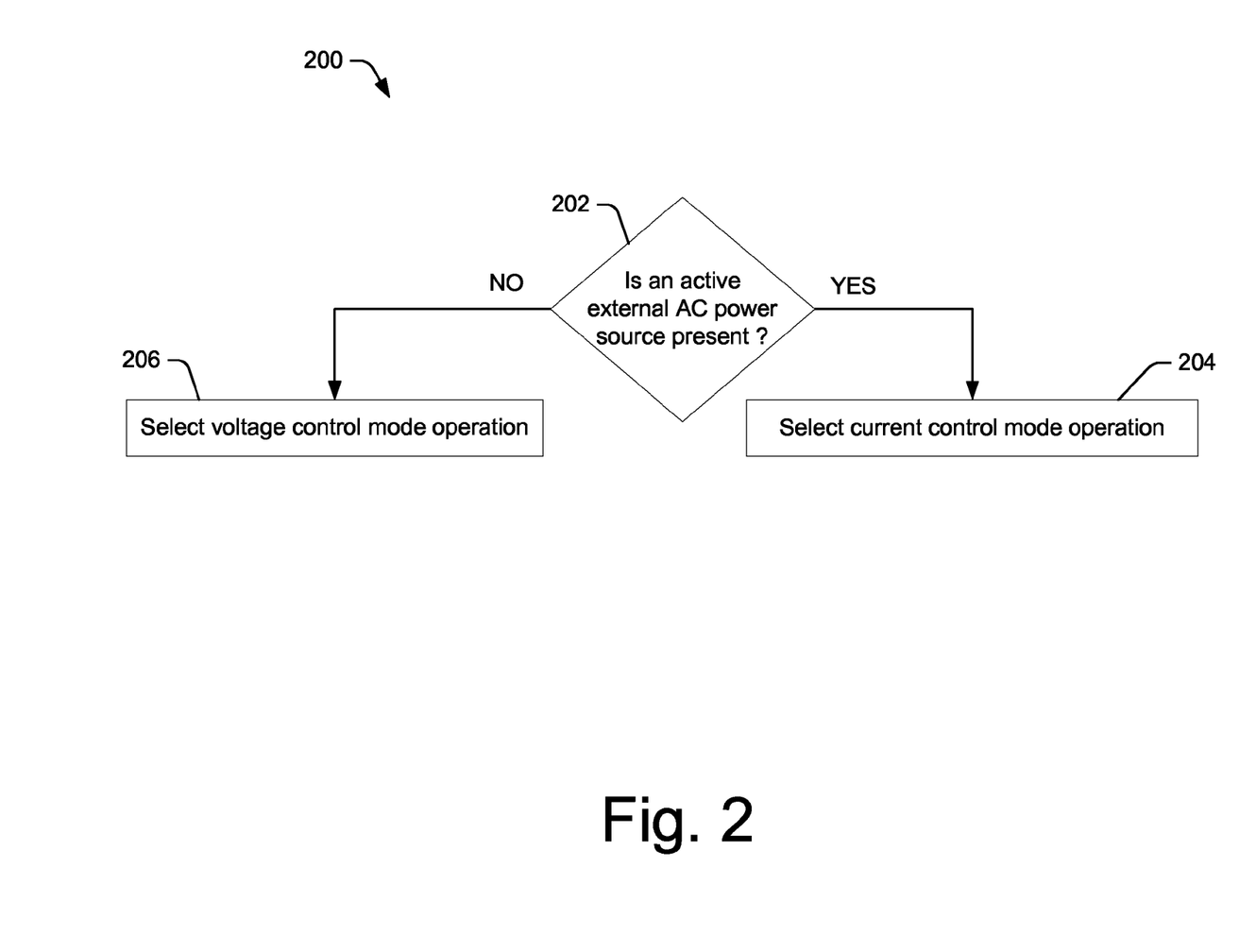
FIG. 2 is a flow diagram of an illustrative process for selecting an operating mode for an example dual mode DC-AC micro-inverter.

FIG. 2 is a flow diagram of an illustrative process 200 for the selection of the current control mode or the voltage control mode of operation for the dual mode DC-AC micro-inverter 100 based on the presence or absence of the external AC power source 122. In process step 202, a determination is made as to whether the External $V_{ac}$ 134 of the external voltage detection circuit 126 indicates that an active external AC power source 122 is present. If the active external AC power source 122 is present at 202, a control mode selection is made at 204 by the mode selector 112 that selects the current control mode of operation. If the external AC power source 122 is absent or inactive, a control mode selection is made at 206 by the mode selector that selects the voltage control mode of operation.

Figure 3:
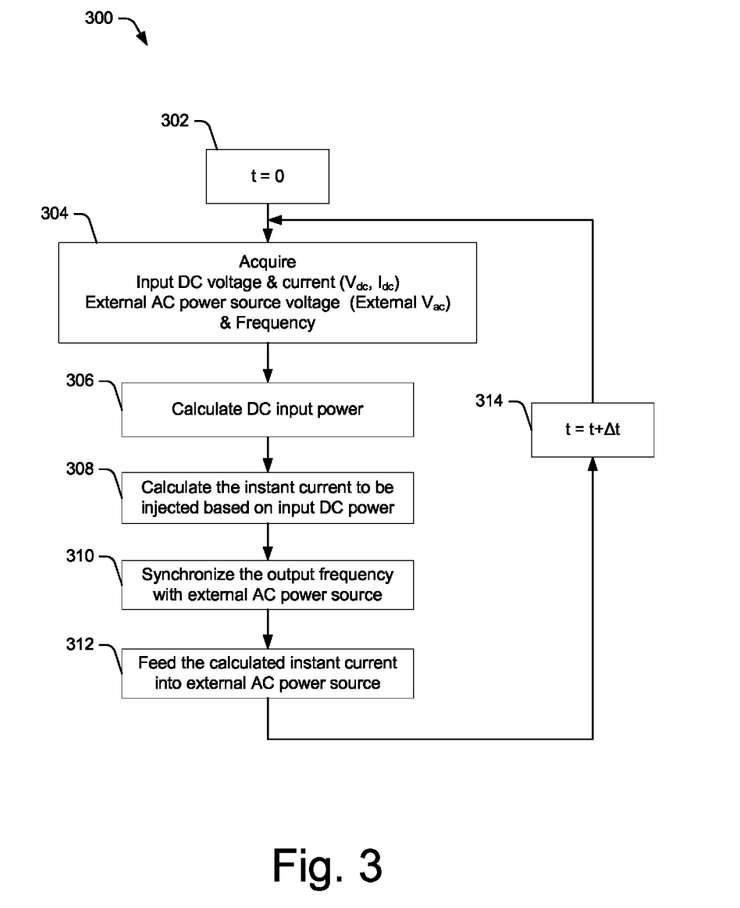
FIG. 3 is a flow diagram of an illustrative process for carrying out the current control mode of operation of an example dual mode DC-AC micro-inverter.

FIG. 3 is a flow diagram of an illustrative process 300 for operation of the dual mode DC-AC micro-inverter 100 when it is operating in the current control mode (the active external AC power source 122 is present). The process 300 may continue from step 204 of FIG. 2 where the current control mode of operation was selected. In the current control mode of operation, a start clock is set at time, t=0, as indicated in the step 302. At 304, the input power parameters ($V_{dc}$ and $I_{dc}$) and the output parameters ($V_{ac}$ and frequency) are sampled at each time interval. At 306, the computing module 105 may compute the amount of available DC power based on the $V_{dc}$ and $I_{dc}$ input parameters that were sampled at 304. At 308, based on the available DC power and the AC voltage of the active external AC power source 122, the amount of current that can be fed into the AC power source 122 is computed by the computing module 105. At 310, the closed loop current control algorithm 114 ensures that the voltage and frequency of the current fed into the external AC power source 122 substantially matches the voltage and frequency of the active external AC power source 122. At 312, the current at proper voltage and frequency that was computed at 308 is fed into the power source 122. This current control process flow (steps 304-312) is repeated at high frequency (for example 56 KHz) with time interval At (for example 17.85 micro seconds) as indicated in step 314.

Figure 4:
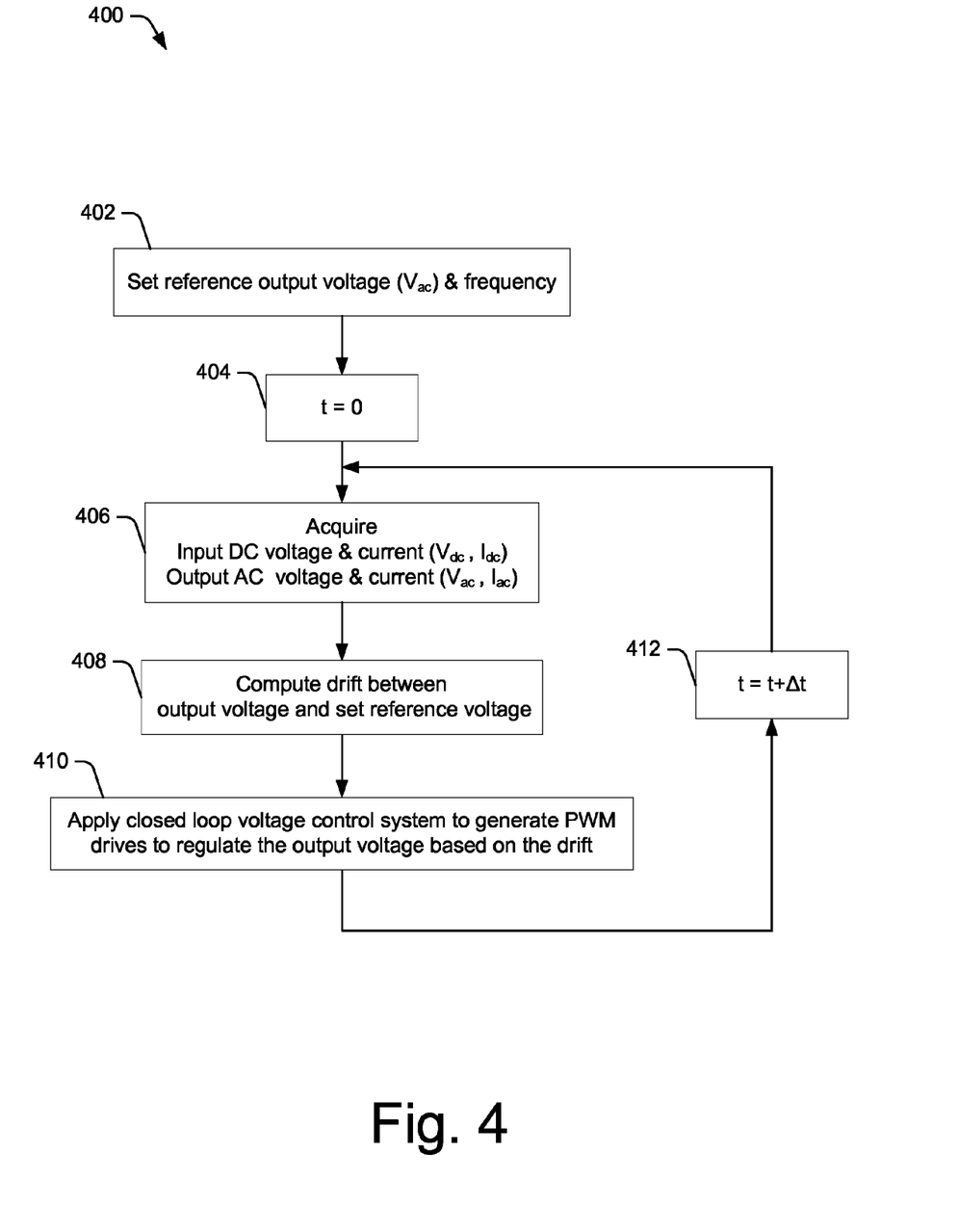
FIG. 4 is a flow diagram of an illustrative process for carrying out the voltage control mode of operation of an example dual mode DC-AC micro-inverter.

FIG. 4 is a flow diagram of an illustrative process 400 for operation of the dual mode DC-AC micro-inverter 100 when it is operating in the voltage control mode (the external AC power source 122 is absent/inactive). The process 400 may continue from step 206 of FIG. 2 where the voltage control mode of operation was selected. In this mode of operation, as there is no external voltage and frequency reference, a reference voltage and frequency from pre-programmed values are synthesized and set at 402 by the voltage control algorithm 116. The output of the inverter 100 can then synchronize with the synthesized reference voltage and frequency. The clock is set at t=0 as indicated in step 404. At 406, the input power parameters ($V_{dc}$ and $I_{dc}$) and the output parameters ($V_{ac}$ and frequency) are sampled at each time interval by the ADC module 106. At 408, the deviation of the output voltage sampled at 406 from the reference voltage set at 402 is computed by the computing and processing module 105. At 410, the closed loop voltage control algorithm 116 applies a correction and the PWM module 108 generates a compensated PWM drive signal based on the deviation computed at 408. This voltage control process flow (steps 406-410) is repeated at high frequency (for example 56 KHz) with time interval At (for example 17.85 micro seconds) as indicated in step 412.

Figure 5:
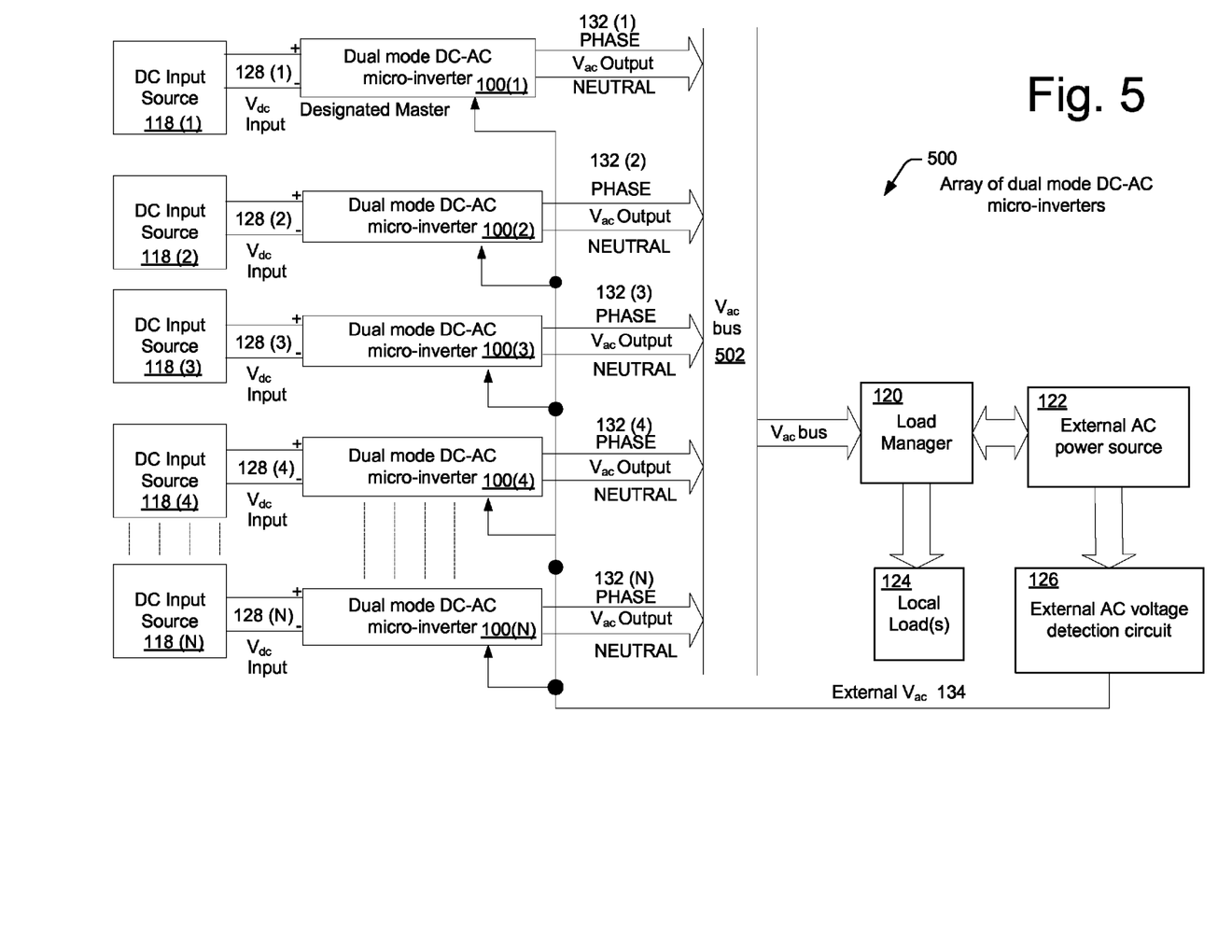
FIG. 5 is a schematic block diagram of an example array of dual mode DC-AC micro-inverters operating when an active external power source is absent (i.e., voltage control mode) illustrating example sub-systems of the array along with input, output, and communication interfaces.

FIG. 5 is a schematic block diagram of an example array of dual mode DC-AC micro-inverters 500 working together with example input, output, and communication interfaces. This diagram shows a plurality of dual mode DC-AC micro-inverters 100(1), 100(2), 100(3) . . . 100(N) in the array 500, each interfaced with a corresponding DC input source 118(1), 118(2), 118(3) . . . 118(N), respectively. $V_{dc}$ input 128(1)-(N) represents the analog signal input from the direct current (DC) input sources 118(1)-(N) to the dual mode DC-AC micro-inverters 100(1)-(N) respectively. AC output 132(1)-(N) of the array of inverters 500 is coupled to a load manager 120 through a $V_{ac}$ bus 502. The load manager 120 is, in turn, coupled to an external AC power source 122 and one or more local loads 124. A control circuit 126 may be configured to detect the presence or absence of active external AC voltage in the external AC power source 122, communicate the status via an External $V_{ac}$ signal 134 to each one of the dual mode DC-AC micro-inverters 100(1), 100(2), 100(3) . . . 100(N) in the array 500 for mode selection.

In the example shown in FIG. 5, the active External AC power source 122 can be absent or inactive, in some instances, and hence one of the dual mode DC-AC micro-inverters, such as the inverter 100(1) shown in FIG. 5, can be designated as a master inverter 100(1). The master dual mode DC-AC micro inverter 100(1) may be configured to synthesize a reference AC voltage and frequency and apply the reference AC voltage and frequency to the AC bus 502 in order for remaining ones of the inverters 100(2), 100(3) . . . 100(N) in the array 500 to synchronize with the synthesized references from the bus 502. The designation of the master 100(1) can be accomplished by either fixed hardware assignment or through a polling process as described in the FIG. 6. The synthesis of the reference voltage and frequency may be accomplished by employing a built in reference function or a table as part of the closed loop voltage control algorithm 116.

Figure 6:
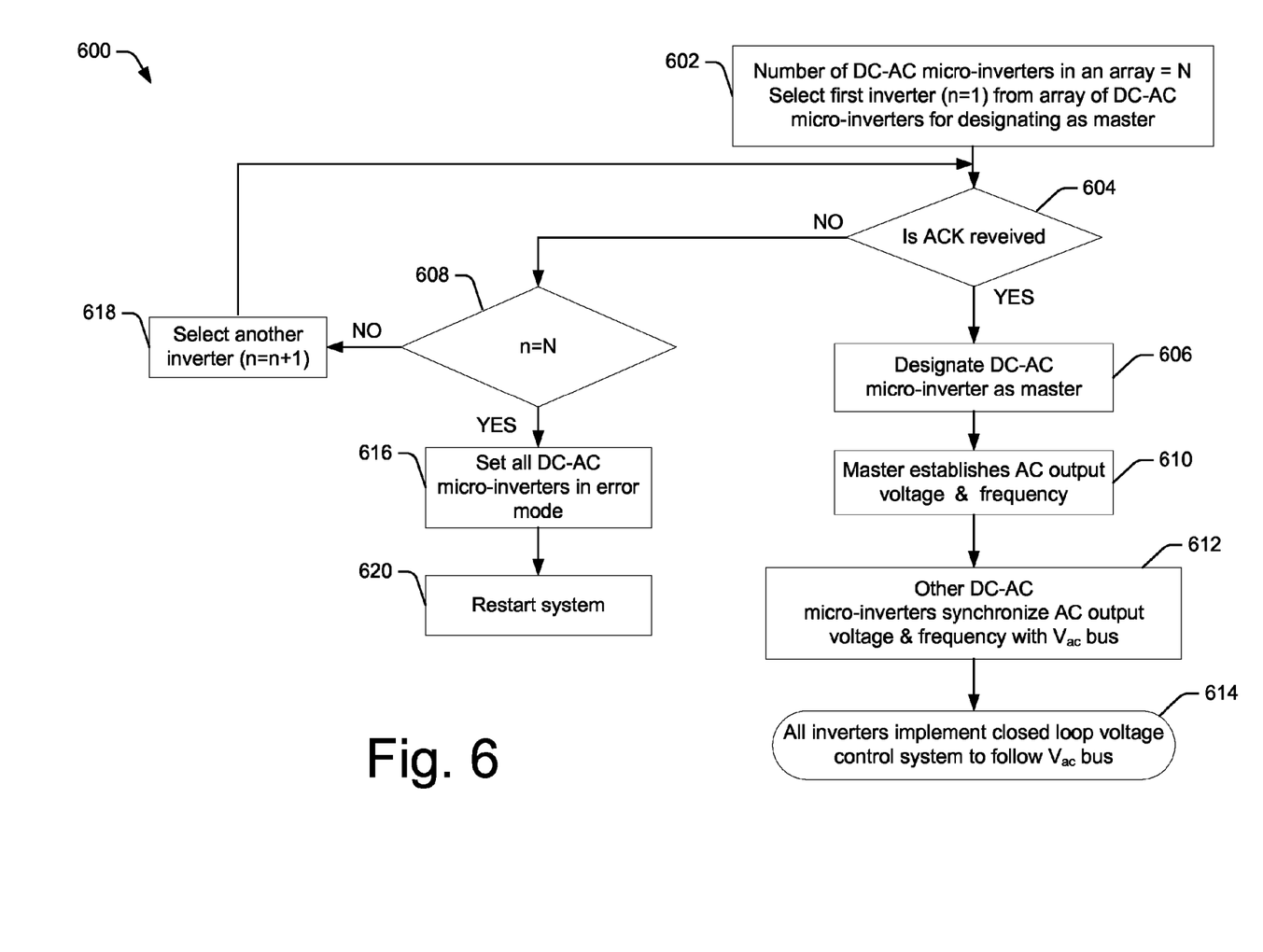
FIG. 6 is a flow diagram of an illustrative process for selecting and designating a master micro-inverter from an array of micro-inverters for establishing the reference voltage and frequency in a voltage control mode of operation.

FIG. 6 is a flow diagram of an illustrative process 600 for the selection and designation of the master dual mode DC-AC micro-inverter, such as the inverter 100(1) in FIG. 5, when the array 500 of inverters 100(1)-(N) is operating in the voltage control mode (the External AC power source 122 is absent or inactive). The initialization step 602 assigns a number 1 through N for each one of the dual mode DC-AC micro-inverters 100(1)-(N) in the array 500 and sends a query signal starting with a first inverter. In steps 604 and 606, if the first inverter responds to the query with a positive acknowledgement, the first inverter is designated as the master. If a positive acknowledgement is not received from the queried dual mode DC-AC micro-inverter at 604, the query is sent (e.g., resent, forwarded, etc.) to the subsequently numbered dual mode DC-AC micro-inverter by proceeding to steps 608 and 618. The query process continues until an acknowledgement is received at 604 from a given inverter and a master is designated at 606, or until all of the N dual mode DC-AC micro-inverters have been queried without a positive acknowledgment, in which case, the process 600 proceeds to 616 where all of the inverters in the array 500 can be set in error mode, and the system restarts at 620.

Subsequent to its designation as the master at 606, the master dual mode DC-AC micro-inverter 100(1) may configure itself to synthesize the reference voltage and frequency by employing a built-in reference function or a table as part of the closed loop voltage control algorithm 116 and apply the synthesized reference voltage at the reference frequency to the $V_{ac}$ bus 502 at 610.

Once the reference voltage at the reference frequency is applied to the $V_{ac}$ bus 502 by the master dual mode DC-AC micro-inverter 100(1) at 610, the other micro-inverters 100(2), 100(3) . . . 100(N) may synchronize their output voltage and frequency with the reference voltage and frequency available in the $V_{ac}$ bus 502 at 612, and implement closed loop voltage control at 614. For example, the implementation of closed loop voltage control mode at 614 for each of the other inverters 100(2)-(N) may be performed according to the process 400 of FIG. 4.

Figure 7:
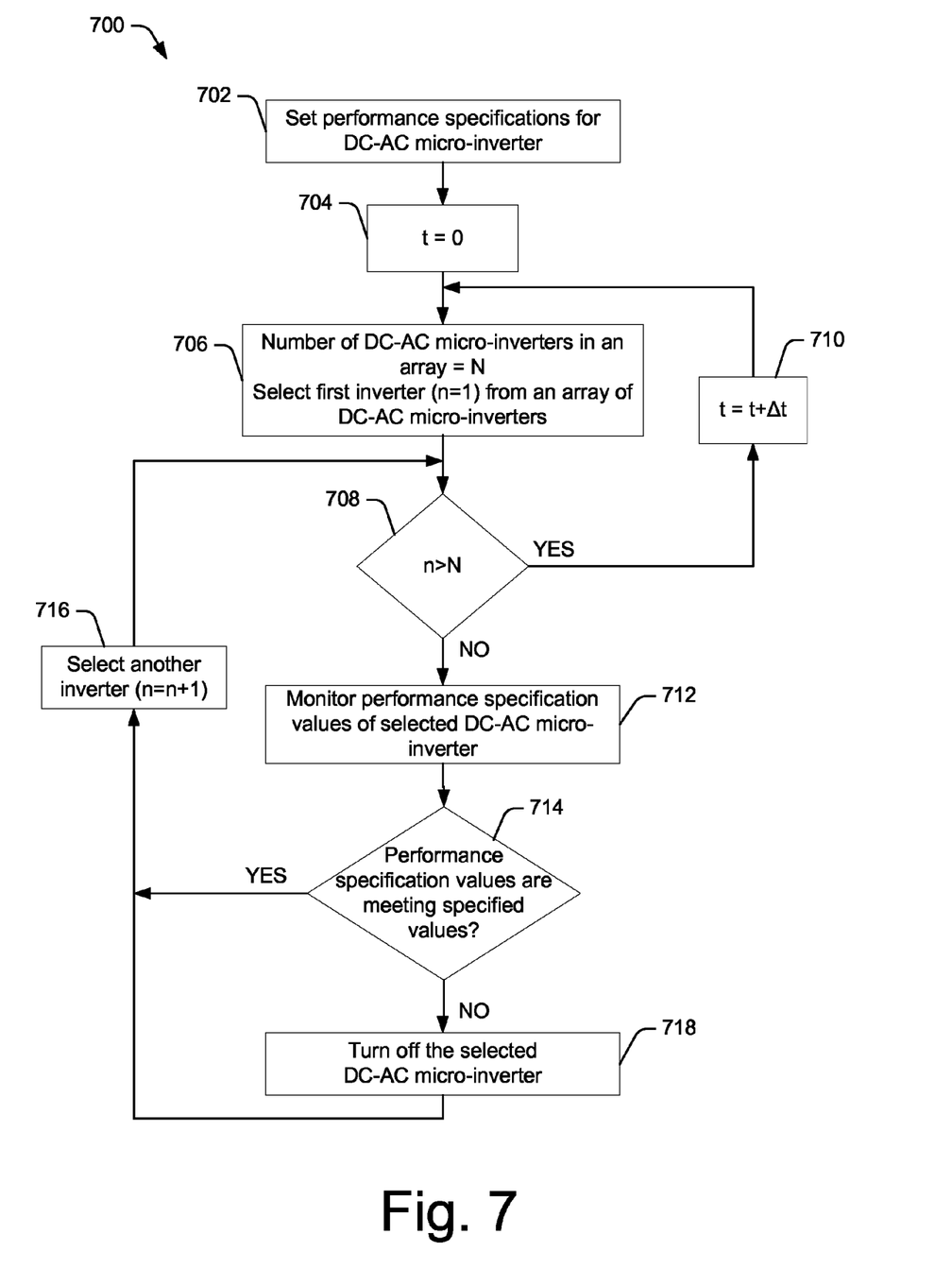
FIG. 7 is a flow diagram of an illustrative process for monitoring the performance of, and controlling, individual ones of the micro-inverters in an array of micro-inverters.

FIG. 7 is a flow diagram of an illustrative process 700 for monitoring the performance and control of each of the micro-inverters 100(1)-(N) in an array 500 of micro-inverters. Due to the modular nature of the dual mode DC-AC micro-inverters 100(1)-(N), an array 500 of micro-inverters 100(1)-(N) can remain functional even if some of the micro-inverters in the array 500 are non-operational. Leveraging this concept, self monitoring and control of the micro-inverters 100(1)-(N) in an array 500 may be implemented by the example process 700.

In this example, the process 700 starts with an initialization step 702 where the performance specifications for each inverter 100(1)-(N) are established. At 704, a clock is set at t=0. At 706, a number 1 through N is assigned for each one of the DC-AC micro-inverters 100(1)-(N) in the array 500. As indicated in the steps 708, 712, 714, and 716, the performance parameters of each one of the DC-AC micro-inverters 100(1)-(N) in the array 500 are collected and verified as to whether they meet the established specifications. As indicated in the decision block 714, if any individual micro-inverter of the plurality of inverters 100(1)-(N) is not meeting the established specifications, that micro inverter can be turned off at 718. This monitoring and control process flow is repeated at a defined frequency (for example 1 KHz) with time interval At (for example 1 millisecond) as indicated in step 710.

Figure 8:
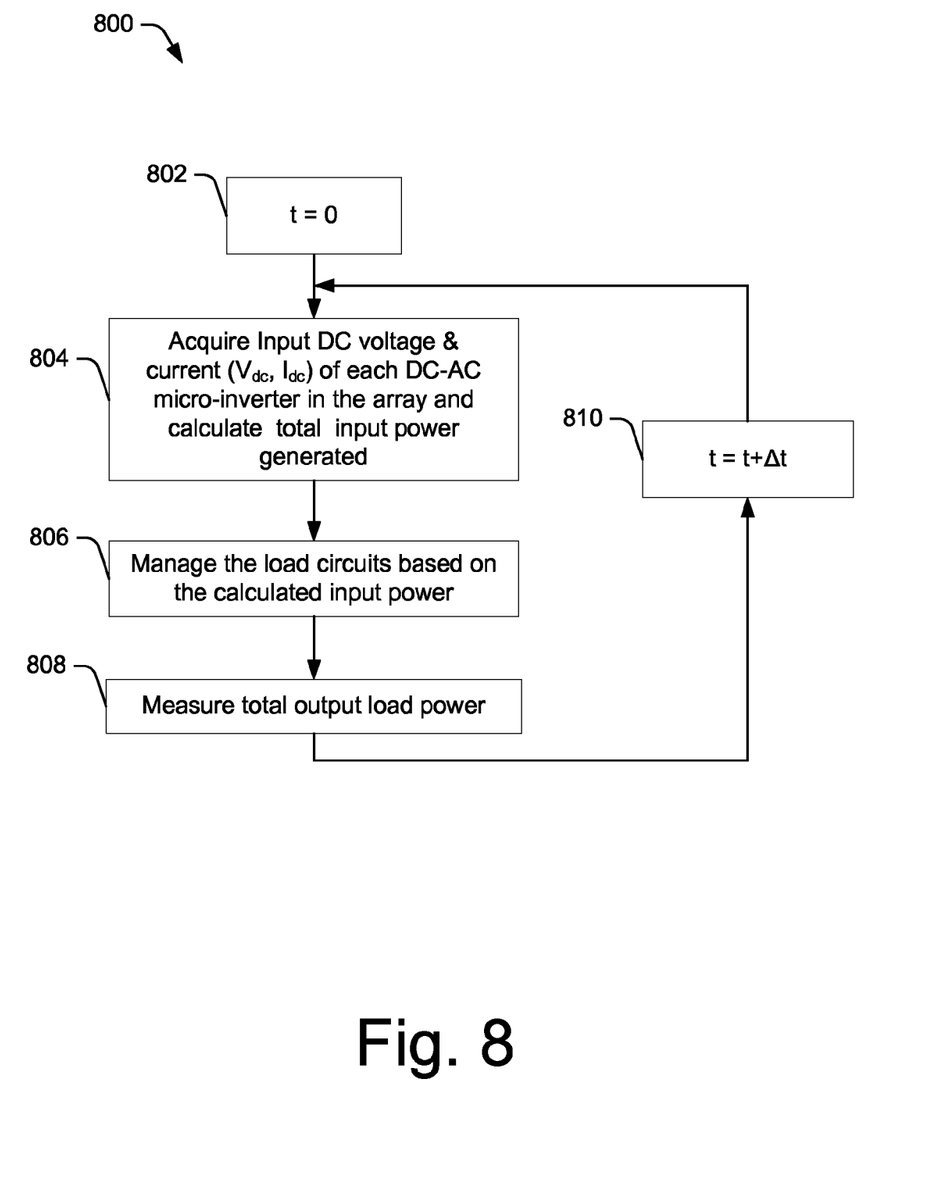
FIG. 8 is a flow diagram of an illustrative process for load balancing among an array of micro-inverters working in conjunction with a load manager.

FIG. 8 is a flow diagram of an illustrative process 800 for load balancing among an array 500 of micro-inverters 100(1)-(N) working in conjunction with a load manager 120. In the case where an external AC power source 122 is absent, management of one or more local loads 124 may be performed in order to maintain the total load connected to the array 500 of DC-AC micro-inverters at a load that is less than the total output power generated. The load manager 120 provides the ability to dynamically calculate the total generated load and manage the local load(s) 124 such that a predetermined load balance condition is satisfied.

At 802, a clock is set at t=0. At 804, the load manager 120 computes the total available DC power by acquiring the input DC voltage and current parameters from each of the DC-AC micro-inverters 100(1)-(N) in the array 500. At 806, the load manager 120 controls the output load(s) 124 such that the total output load is less than the total available DC power computed at 804. At 808, the total output power delivered is measured and recorded. This monitoring and control process flow (steps 804-808) is repeated at a defined frequency (for example 1 KHz) with time interval Δt (for example 1 millisecond) as indicated in step 810.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A dual mode direct current-to-alternating current (DC-AC) micro-inverter comprising:
    a DC-AC converter to convert direct current (DC) voltage into alternating current (AC) voltage output; and
    a microcontroller comprising a mode selector to select between operating the DC-AC micro-inverter in at least one of: (i) a current control mode upon receipt of an indication that active external AC power is available, or (ii) a voltage control mode upon receipt of an indication that active external AC power is unavailable.

2. The dual mode DC-AC micro-inverter of claim 1, wherein the DC-AC converter is configured to employ one or more high frequency transformers operating in at least one of: (i) a single stage DC-AC conversion mode, or (ii) a two stage DC-DC-AC conversion mode.

3. The dual mode DC-AC micro-inverter of claim 1, wherein the DC-AC converter is configured to receive Pulse Width Modulated (PWM) drive signals derived from a closed loop current control algorithm or a closed loop voltage control algorithm or a combination thereof through a PWM module.

4. The dual mode DC-AC micro-inverter of claim 1, wherein the DC-AC converter is configured to apply Maximum Power Point Tracking algorithm stored in the digital signal controller for achieving better efficiency of operation.

5. The dual mode DC-AC micro-inverter of claim 1, further comprising one or more sensors and one or more fault protection features for at least one of:
input DC voltage high/low limits;
voltage high/low limits for the output voltage;
output current limit; or
temperature.

6. The dual mode DC-AC micro-inverter of claim 1, wherein the DC voltage that is input to the DC-AC converter is derived from at least one of: (i) a photovoltaic solar panel, (ii) a fuel cell, (iii) a battery, (iv) a wind energy generator, or (v) an ultra capacitor.

7. A method of operating a dual mode direct current-to-alternating current (DC-AC) micro-inverter comprising:
converting direct current (DC) voltage into alternating current (AC) voltage;
receiving an indication that external AC power is either available or unavailable; and
in response to the receiving the indication, selecting between:
operating the dual mode DC-AC micro-inverter in a current control mode upon determining that the external AC power is available; and
operating the dual mode DC-AC micro-inverter in a voltage control mode upon determining that the external AC power is unavailable.

8. The method of claim 7, wherein the indication indicates that the external AC power is unavailable, and wherein the operating the dual mode DC-AC micro-inverter in the voltage control mode further comprises:
synthesizing a reference voltage and a reference frequency; and
regulating an output voltage of the dual mode DC-AC micro-inverter to substantially match the reference voltage and the reference frequency.

9. A dual mode direct current-to-alternating current (DC-AC) micro-inverter configured to operate in current control mode when a connection to an active external alternating current (AC) power source is present, the dual mode DC-AC micro-inverter comprising a current control algorithm to:
calculate an output current based at least in part on available direct current (DC) input power and a voltage of the active external AC power source; and
synchronize the voltage and frequency associated with the output current with the voltage and frequency of the active external AC power source.

10. A dual mode direct current-to-alternating current (DC-AC) micro-inverter configured to operate in voltage control mode when a connection to an external alternating current (AC) power source is absent or not active, the dual mode DC-AC micro-inverter comprising a voltage control algorithm to:
synthesize a reference voltage and a reference frequency based on a built in function or a table; and
regulate an output voltage of the dual mode DC-AC micro-inverter to substantially match the reference voltage and the reference frequency.

11. A method of operating an array of dual mode direct current-to-alternating current (DC-AC) micro-inverters when a connection to an external alternating current (AC) power source is absent or not active, the method comprising:
designating a micro-inverter in the array as a master micro-inverter;
establishing a reference output voltage and a reference output frequency using the master micro-inverter; and
operating remaining ones of the micro-inverters in the array in voltage control mode to synchronize respective output voltages and output frequencies of the remaining ones of the micro-inverters with the reference output voltage and the reference output frequency.

12. The method of claim 11, wherein the designating the master micro-inverter is done by at least one of a hardware setting or a software setting.

13. The method of claim 11, further comprising:
powering the master micro-inverter in the array in order to establish the reference output voltage and the reference output frequency; and
in response to the establishing the reference output voltage and the reference output frequency, powering up the remaining ones of the micro-inverters in the array.

14. The method of claim 11, wherein the reference output voltage and the reference output frequency are maintained by an active bus irrespective of continued operation of the master micro-inverter as part of the array.

15. The method of claim 11, wherein the designating the master micro-inverter comprises:
polling, by a control algorithm, individual ones of the micro-inverters in the array;
receiving acknowledgement signals from individual ones of the micro-inverters in the array;
identifying at least one of the received acknowledgement signals as a satisfactory acknowledgement; and
designating a micro-inverter associated with the satisfactory acknowledgement as the master micro-inverter for establishing the reference output voltage and the reference output frequency.

16. The method of claim 15, wherein the polling comprises:
polling the micro-inverters in the array in a predetermined sequence for the acknowledgement signals; and
identifying, as the master micro-inverter, a particular micro-inverter associated with a first received satisfactory acknowledgement.

17. The method of claim 11, further comprising:
periodically monitoring performance of individual ones of the micro-inverters in the array; and
turning off ones of monitored micro-inverters having a performance that does not meet or exceed a predetermined performance threshold.

18. The method of claim 11, further comprising:
sensing, by a control circuit, a presence or an absence of the external AC power source; and
communicating a status to the array based at least in part on the sensing.

19. The method of claim 18, further comprising physically disconnecting, by a switching mechanism, the external AC power source from the array when the external AC power source is present but not active.

20. The method of claim 11, further comprising:
dynamically monitoring and controlling a load connected to the array; and
maintaining a level of the connected load below a level of available output power from the array.

* * * * *